United States Patent
Chou et al.

(10) Patent No.: US 7,125,445 B2
(45) Date of Patent: Oct. 24, 2006

(54) RED COLORANT COMPOSITION AND MAGENTA INKJET INK COMPOSITION WITH STABLE PH

(75) Inventors: Kai-Pin Chou, Taoyuan Hsien (TW); Yun-I Liu, Taoyuan (TW); Yu-Ting Lin, Lujou (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 11/085,773

(22) Filed: Mar. 21, 2005

(65) Prior Publication Data

US 2005/0211133 A1    Sep. 29, 2005

(30) Foreign Application Priority Data

Mar. 23, 2004 (TW) ............... 93107762 A

(51) Int. Cl.
  *C09D 11/02* (2006.01)
  *C09B 67/00* (2006.01)
  *B41J 2/01* (2006.01)

(52) U.S. Cl. ............... 106/31.48; 8/549; 8/641; 347/100

(58) Field of Classification Search ......... 106/31.48; 8/549, 641; 347/100
See application file for complete search history.

(56) References Cited

U.S. PATENT DOCUMENTS

| | | | |
|---|---|---|---|
| 5,824,785 A * | 10/1998 | Baettig et al. ............ 534/803 |
| 5,858,075 A * | 1/1999 | Deardurff et al. ........ 106/31.27 |
| 6,176,913 B1 * | 1/2001 | Kasperchik et al. ..... 106/31.48 |
| 6,241,789 B1 * | 6/2001 | Scheibli et al. ............... 8/682 |
| 6,514,329 B1 * | 2/2003 | Carr et al. .............. 106/31.48 |
| 6,517,620 B1 * | 2/2003 | Carr et al. .............. 106/31.48 |
| 6,521,032 B1 * | 2/2003 | Lehmann et al. ........ 106/31.51 |
| 6,596,067 B1 * | 7/2003 | Menzel et al. .......... 106/31.51 |
| 6,630,005 B1 * | 10/2003 | Tzikas et al. ................. 8/549 |
| 6,790,268 B1 * | 9/2004 | Lee et al. ................ 106/31.36 |
| 6,824,598 B1 * | 11/2004 | Thornberry et al. ..... 106/31.27 |
| 6,843,838 B1 * | 1/2005 | Zimmer et al. .......... 106/31.27 |
| 2002/0139281 A1 * | 10/2002 | Stoffel et al. ............ 106/31.51 |
| 2003/0136299 A1 * | 7/2003 | Chien et al. ............. 106/31.27 |
| 2005/0087099 A1 * | 4/2005 | Blease et al. ............ 106/31.27 |
| 2005/0264600 A1 * | 12/2005 | Moffatt et al. ................ 347/33 |

FOREIGN PATENT DOCUMENTS

| JP | 2001-81368 | 3/2001 |
|---|---|---|
| JP | 2002241639 | 8/2002 |
| WO | WO 97/16496 | 5/1997 |

OTHER PUBLICATIONS

Taiwan Patent Office Action mailed Feb. 22, 2006.

* cited by examiner

*Primary Examiner*—Helene Klemanski
(74) *Attorney, Agent, or Firm*—Thomas, Kayden, Horstemeyer & Risley

(57) ABSTRACT

A magenta inkjet ink composition with good pH value stability including at least one reactive red colorant; at least one azo red dye (such as M377); and an aqueous solution medium.

16 Claims, 2 Drawing Sheets

RED COLORANT COMPOSITION AND MAGENTA INKJET INK COMPOSITION WITH STABLE PH

BACKGROUND OF THE INVENTION

1. Field of the Invention

The present invention relates to a magenta inkjet ink composition, and more particularly to a magenta inkjet ink composition with good pH value stability.

2. Description of the Related Art

In recent years, the dye added to color inkjet ink is generally maintained within a range from neutral to weakly basic. An ink which is too acidic or too basic erodes the print head and reduces the dyeability of the print medium (such as paper), thus print quality suffers. Ink stored or operated at high temperature degrades rapidly, further affecting print quality. The adverse phenomenon is more apparent when reactive dye is used.

In color inkjet printing, a primary dye set includes cyan ink, magenta ink, yellow ink, and black ink. In order to obtain good color and address the disadvantage of single colorant, any one of the four inks generally includes more than two colorants. For example, reactive dye RR31 can be used to adjust magenta color. The functional groups of the reactive dye, however, easily react with water resulting in decomposition thereof. Thus, the entire ink becomes acidic (that is, pH value decreases).

A small amount of a pH buffer solution is generally added to prevent hydrolysis of ink due to the reactive dye. For example, in U.S. Pat. No. 5,858,075, U.S. Pat. No. 6,176,913, and Japan. Pat. No. 2002241639, a pH buffer solution is added to the ink composition to prevent degradation (hydrolysis). Hydrolysis is a continuous reaction, however, and the buffer solution is consumed gradually. Therefore, the effectiveness of the buffer solution is reduced over time.

SUMMARY OF THE INVENTION

Therefore, an object of the present invention is to solve the above-mentioned problems and stabilize the pH value of a reactive red colorant through use of a special azo red dye. The present invention provides a red colorant composition and a magenta inkjet ink composition with good pH value stability and light resistance.

To achieve the above object, the red colorant composition of the present invention includes at least one reactive red colorant; and at least one azo red dye.

The azo red dye of the present invention has the following formula (I)

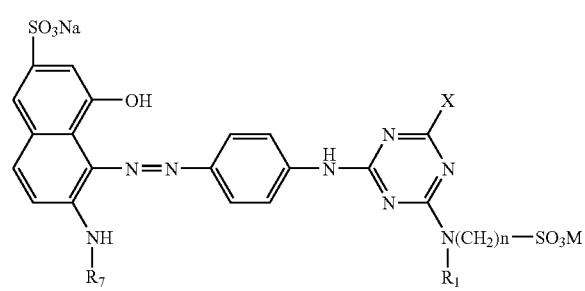

wherein $R_1$ is hydrogen or an aliphatic radical having from 1 to 6 carbon atoms;

n is 2, 3, or 4;

X is $NR_3R_4$ wherein
  $R_3$ and $R_4$ are independently hydrogen, alkyl from 1 to 6 carbon atoms, C2 to C6 substituted alkyl where the substituents are OH, $OCH_3$, COOM, $SO_3M$; aralkyl; unsubstituted aryl or an aryl substituted by COOM or $SO_3M$; or
  $R_3$ and $R_4$ form a ring with or without inclusion of a hetero atom; or X is $SR_5$ in which $R_5$ is alkyl from 1 to 6 carbon atoms, C2 to C6 substituted alkyl where the substituents are OH, $OCH_3$, COOM, or $SO_3M$; or X is $OR_6$ in which $R_6$ is hydrogen or an aliphatic radical having from 1 to 6 carbon atoms;

$R_7$ is hydrogen, alkyl of 1 to 6 carbon atoms, C2 to C6 substituted alkyl where the substituents are CN, COOM, OH, $COOCH_3$, $COOCH_2CH_3$; unsubstituted aryl or aryl substituted by $CH_3$ or halogen; and M is hydrogen, a metal atom, an ammonium or ammonium substituted with alkyl, alkoxyalkyl and hydroxyalkyl each having 1 to 12 carbon atoms.

The magenta inkjet ink composition with good pH value stability of the present invention includes at least one reactive red colorant, at least one azo red dye having the above formula (I), and an aqueous solution medium.

The present invention also provides an inkjet printing method. A magenta inkjet ink composition is provided, which includes at least one reactive red colorant, at least one azo red dye having the above formula (I), and an aqueous solution medium. The magenta inkjet ink composition is then ejected onto a print medium.

DETAILED DESCRIPTION OF THE INVENTION

Figure 1:
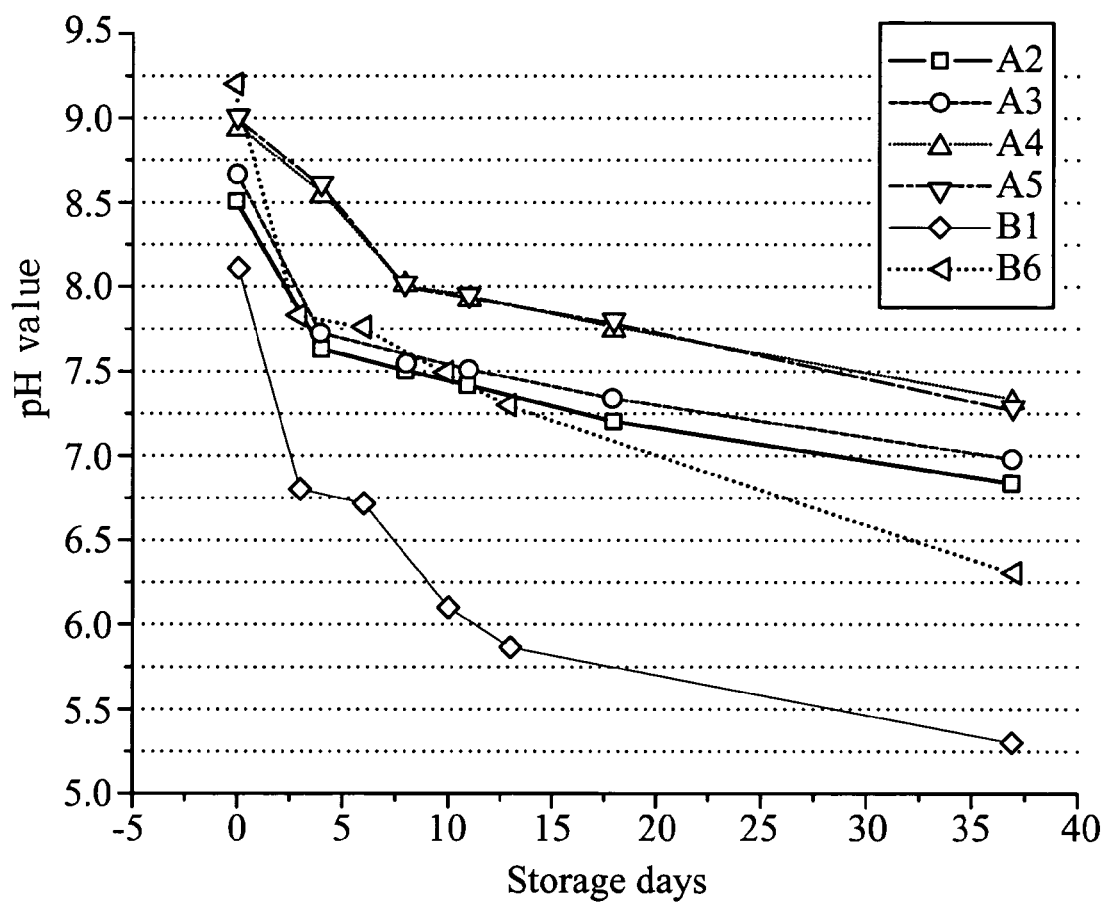
FIG. 1 shows the pH variation of the inks, including reactive colorant RR31, of Comparative Examples (B1 and B6) and the present invention (Examples A2–A5) over storage duration.

Generally, the pH value of the reactive red colorants is unstable. Therefore, the present invention employs a special azo red dye to improve the pH value stability of the reactive red colorant.

The special azo red dye of the present invention has the following formula (I)

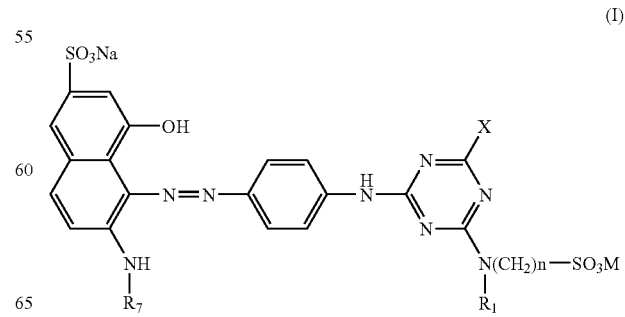

wherein

R₁ is hydrogen or an aliphatic radical having from 1 to 6 carbon atoms;

n is 2, 3, or 4;

X is NR₃R₄ wherein

R₃ and R₄ are independently hydrogen, alkyl from 1 to 6 carbon atoms, C2 to C6 substituted alkyl where the substituents are OH, OCH₃, COOM, SO₃M; aralkyl; unsubstituted aryl or an aryl substituted by COOM or SO₃M; or R₃ and R₄ form a ring with or without inclusion of a hetero atom; or X is SR₅ in which R₅ is alkyl from 1 to 6 carbon atoms, C2 to C6 substituted alkyl where the substituents are OH, OCH₃, COOM, or SO₃M; or X is OR₆ in which R₆ is hydrogen or an aliphatic radical having from 1 to 6 carbon atoms;

R₇ is hydrogen, alkyl of 1 to 6 carbon atoms, C2 to C6 substituted alkyl where the substituents are CN, COOM, OH, COOCH₃, COOCH₂CH₃; unsubstituted aryl or aryl substituted by CH₃ or halogen; and M is hydrogen, a metal atom, an ammonium or ammonium substituted with alkyl, alkoxyalkyl and hydroxyalkyl each having 1 to 12 carbon atoms.

The azo red dye suitable for use in the present invention can be Magenta 377 (M377 from ILFORD) having formula (II)

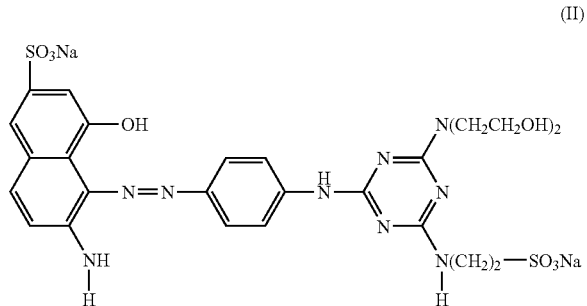

The reactive red colorant suitable for use in the present invention is not limited. Representative examples include Reactive Orange 9, Reactive Orange 12, Reactive Orange 13, Reactive Orange 16 (from Aldrich), Reactive Red 15, Reactive Red 24:1 (from BASF), Reactive Red 23 (from Clariant), Reactive Red 31 (from Avecia), Reactive Red 120 (from BASF), Reactive Red 141 (from Bayer), Reactive Red 158 (from Bayer), Reactive Red 159 (from Bayer), and Reactive Red 180 (from Clariant).

The present invention also provides a magenta inkjet ink composition with good pH value stability, which includes at least one reactive red colorant, at least one of the above azo red dyes having formula (I), and an aqueous solution medium.

In the magenta inkjet ink composition of the present invention, the reactive red colorant can be present in an amount of 0.1 to 10 weight %, preferably 2 to 8 weight %. The azo red dye can be present in an amount of 0.1 to 10 weight %, preferably 2 to 8 weight %. The aqueous solution medium can be present in an amount of 50 to 95 weight %, preferably 70 to 90 weight %.

In addition to water, the aqueous solution medium can further include other additives such as a surfactant, a humectant, an organic solvent, a pH buffer solution, a chelating agent, a biocide, a preservative, a UV-blocker, or mixtures thereof.

The main function of the surfactant is to decrease the surface tension of the ink. Further, the moisturizing effect can be increased, thus making ink-delivery and ink-ejection more smooth. The surfactant also functions as a dispersant. In practical uses, a dispersive dye will easily crystallize or coagulate the colorant, thus clogging the nozzles at the ink cartrige. Therefore, the moisturizing effect of the dispersant must be enhanced to increase the dispersion of the additives. Generally, an ink composition can include at lease one surfactant. The surfactant can be anionic, cationic, nonionic, or zwitterionic and added in a total amount below 20 weight %, preferably below 15 weight %.

The surfactant suitable for use in the present invention can be polyethandiol, polypropandiol, EO/PO copolymer, sodium dioctyl sulfonsuccinate, polybutyl resin, cellulose derivatives, styrene/acrylic copolymer resin, maleic acid/styrene copolymer, or a polymer containing both hydrophilic and hydrophobic segments.

The humectant is usually a low volatile liquid and has good miscibility with the main solution. The addition of the humectant can prevent evaporation of ink in the nozzle of the ink cartridge, which can generate precipitation and crystals therein, thus preventing obstruction of the nozzle. Typical humectants used in the ink-jet ink can be ethylene glycol, diethylene glycol or glycerol, added in an amount of 10 to 30 weight %, preferably below 20 weight % based on the weight of the aqueous solution medium.

The addition of the chelating agent can prevent generation of crystalline salt. This prevents coagulation of particles and obstruction of the nozzle of the ink cartridge. Chelating agents suitable for use include sodium ethylenediaminetetraacetate, trisodium nitrilotriacetate, hydroxyethyl ethylenediamine trisodium acetate, diethylenetriamino pentasodium acetate, and uramil disodium acetate.

The azo red dye of formula (I) added in the ink of the present invention has a pH value stabilizing effect. Thus, addition of a pH buffer solution (which is added conventionally) in the ink of the present invention is not required. The present invention, however, is not limited to this. The ink composition of the present invention can also include a suitable pH buffer solution according to requirements in order to further increase the pH stability of the ink.

The pH buffer solution suitable for use in the present invention can be diethanolamine, triethanolamine, hydroxides of alkali metal such as lithium hydroxide, sodium hydroxide, and potassium hydroxide, ammonium hydroxide, and carbonates of alkali metals such as lithium carbonate, sodium carbonate, and potassium carbonates.

The organic solvent suitable for use in the present invention can be cyclohexane, methanol, ethanol, ethylene glycol, diethylene glycol, triethylene glycol, polyethylene glycol, propylene glycol, butylene glycol, pentylene glycol, hexylene glycol, or polyhydoxy alcohols.

In addition, the ink composition of the present invention can further include a UV-blocker to block the absorbance of the UV light and increase the light resistance of the colorant. A biocide or preservative can be added to inhibit the growth of microorganisms. A dispersant can be added to increase the dispersion ability of the additives in the ink.

In addition to the above-mentioned reactive red colorant and the azo red dye, the ink composition of the present invention can further include other red colorants, either a red dye or pigment. Suitable red dyes include Direct Red 75 (from Bayer), Acid Red 52 (from Clariant), 82 (from Bayer), 87 (from BASF), 92 (from Orient), and M1114 (From ILFORD). Suitable red pigments include C.I pigment violet 19 (from Clariant), C.I pigment red 122 (from Bayer), 176 pigment red 122 (from Clariant), 184 (from Clariant), and 185 (from Clariant).

The red colorant composition of the present invention has good pH value stability. Therefore, when the red colorant composition is applied in inkjet printing, good printing quality results.

The following examples are intended to illustrate the process and the advantages of the present invention without limiting its scope, since numerous modifications and variations will be apparent to those skilled in the art.

EXAMPLES A1–A3

Magenta ink compositions A1–A3 were prepared by mixing the components listed in Table 1. The magenta ink compositions A1–A3 were then stored at 60° C. and the pH thereof was measured to observe pH variation over time. The amount(%) of each component in the following tables represents weight percent (%). The results are shown in Table 2.

TABLE 1

Formulations of magenta ink compositions A1 to A3 of the present invention

| Component | Supplier | A1 | A2 | A3 |
|---|---|---|---|---|
| M377 | Ilford | 1.5% | 1.75% | 2% |
| M1114 | Ilford | 0 | 0.5% | 0.75% |
| RR-31 | Avecia | 1.5% | 1.5% | 1% |
| Buffer | | 0 | 0% | 0 |
| PEG200 | Acros | 5% | 5% | 5% |
| 2-pyrrolidone | Acros | 5% | 5% | 5% |
| EHMPD | Aldrich | 5% | 5% | 5% |
| Biocide | Clariant | 0.5% | 0.5% | 0.5% |
| 1,2-propanediol | Acros | 2% | 2% | 2% |
| Water | | Balance | Balance | Balance |

TABLE 2

Variation on pH of magenta ink compositions A1 to A3 over storage at 60° C.

| Storage days | A1 | A2 | A3 |
|---|---|---|---|
| 0 day | 7.24 | 8.5 | 8.65 |
| 4 days | 6.6 | 7.63 | 7.72 |
| 8 days | 6.56 | 7.49 | 7.54 |
| 11 days | 6.51 | 7.41 | 7.5 |
| 18 days | 6.33 | 7.19 | 7.33 |
| 37 days | 6.11 | 6.83 | 6.97 |

EXAMPLES A4 AND A5

Magenta ink compositions A4 and A5 were prepared by mixing the components listed in Table 3. The magenta ink compositions A4 and A5 were then stored at 60° C. and the pH thereof was to observe pH variation over time. The results are shown in Table 4.

TABLE 3

| Component | Supplier | A4 | A5 |
|---|---|---|---|
| M377 | Ilford | 1.75% | 2% |
| M1114 | Ilford | 0.5% | 0.75% |
| RR-31 | Avecia | 1.5% | 1% |
| Buffer | TCI | 0.05% | 0.05% |
| PEG200 | Clariant | 5% | 5% |
| 2-pyrrolidone | Acros | 5% | 5% |
| EHMPD | Aldrich | 5% | 5% |
| Biocide | Clariant | 0.5% | 0.5% |
| 1,2-propanediol | Acros | 2% | 2% |
| Water | | Balance | balance |

TABLE 4

| Storage days | A4 | A5 |
|---|---|---|
| 0 day | 8.92 | 8.99 |
| 4 days | 8.53 | 8.6 |
| 8 days | 8.01 | 8.01 |
| 11 days | 7.91 | 7.93 |
| 18 days | 7.74 | 7.8 |
| 37 days | 7.32 | 7.29 |

EXAMPLE A6

Magenta ink composition A6 was prepared by mixing the components listed in Table 5 and then stored at 60° C. and the pH thereof was measured to observe pH variation over time. The results are shown in Table 6.

TABLE 5

| Component | Supplier | A6 |
|---|---|---|
| M377 | Ilford | 1.75% |
| RR-180 | Clariant | 1.75% |
| Buffer | TCI | 0.05% |
| PEG200 | Clariant | 5% |
| 2-pyrrolidone | Acros | 5% |
| EHMPD | Aldrich | 5% |
| Biocide | Clariant | 0.5% |
| 1,2-propanediol | Acros | 2% |
| Water | | Balance |

TABLE 6

| Storage days | A6 |
|---|---|
| 0 day | 7.67 |
| 4 days | 6.62 |
| 8 days | 6.41 |
| 11 days | 6.35 |

COMPARATIVE EXAMPLES B1–B6

Magenta ink compositions B1–B6 were prepared by mixing the components listed in Table 7 and then stored at 60° C. and the pH thereof was measured to observe pH variation over time. The results are shown in Table 8.

TABLE 7

| Component | Supplier | B1 | B2 | B3 | B4 | B5 | B6 |
|---|---|---|---|---|---|---|---|
| RR-31 | Clariant | 3% | 3% | 3% | 3% | 3% | 3% |
| Buffer | TCI | 0 | 0.02% | 0.04% | 0.06% | 0.08% | 0.10% |
| PEG200 | Clariant | 5% | 5% | 5% | 5% | 5% | 5% |
| 2-pyrrolidone | Acros | 5% | 5% | 5% | 5% | 5% | 5% |
| EHMPD | Aldrich | 5% | 5% | 5% | 5% | 5% | 5% |
| Biocide | Clariant | 0.5% | 0.5% | 0.5% | 0.5% | 0.5% | 0.5% |
| 1,2-propanediol | Acros | 2% | 2% | 2% | 2% | 2% | 2% |
| Water | | balance | balance | balance | balance | balance | balance |

TABLE 8

| Storage days | B1 | B2 | B3 | B4 | B5 | B6 |
|---|---|---|---|---|---|---|
| 0 | 8.1 | 8.67 | 8.71 | 8.87 | 9.03 | 9.19 |
| 3 | 6.8 | 7.19 | 7.22 | 7.51 | 7.67 | 7.83 |
| 6 | 6.72 | 6.82 | 7 | 7.33 | 7.53 | 7.76 |
| 10 | 6.1 | 6.7 | 6.8 | 7.05 | 7.3 | 7.5 |
| 13 | 5.86 | 6.42 | 6.54 | 7.02 | 7.18 | 7.3 |
| 37 | 5.3 | 5.66 | 5.79 | 5.95 | 6.09 | 6.3 |

COMPARATIVE EXAMPLES B7–B9

Magenta ink compositions B7–B9 were prepared by mixing the components listed in Table 9 and then stored at 60° C. and the pH thereof was measured to observe pH variation over time. The results are shown in Table 10.

TABLE 9

| Component | Supplier | B7 | B8 | B9 |
|---|---|---|---|---|
| RR-31 | Clariant | 3% | 3% | 3% |
| Buffer | TCI | 0.05% | 0.10% | 0.15% |
| PEG200 | Clariant | 5% | 5% | 5% |
| 2-pyrrolidone | Acros | 5% | 5% | 5% |
| EHMPD | Aldrich | 5% | 5% | 5% |
| Biocide | Clariant | 0.5% | 0.5% | 0.5% |
| 1,2-propanediol | Acros | 2% | 2% | 2% |
| Water | | balance | balance | balance |

TABLE 10

| Storage days | B7 | B8 | B9 |
|---|---|---|---|
| 0 day | 8.53 | 9.02 | 9.09 |
| 3 days | 6.2 | 6.27 | 6.46 |
| 6 days | 5.84 | 5.87 | 6.12 |

COMPARATIVE EXAMPLE B10

Magenta ink composition B10 was prepared by mixing the components listed in Table 11 and then stored at 60° C. and the pH thereof was measured to observe pH variation over time. The results are shown in Table 12.

TABLE 11

| Component | Supplier | B10 |
|---|---|---|
| RR-180 | Clariant | 1.75% |
| Buffer | TCI | 0.05% |
| PEG200 | Clariant | 5% |
| 2-pyrrolidone | Acros | 5% |
| EHMPD | Aldrich | 5% |
| Biocide | Clariant | 0.5% |
| 1,2-propanediol | Acros | 2% |
| Water | | balance |

TABLE 12

| Storage days | B10 |
|---|---|
| 0 day | 7.30 |
| 4 days | 5.29 |
| 8 days | 4.68 |
| 11 days | 4.56 |

The above experimental results indicate that the ink compositions of Comparative Examples B1–B9, including reactive colorant RR31 and buffer, have unstable pH value during storage at 60° C. and thus become more acidic. In contrast, the inks of Examples A1–A5 of the present invention, including RR31 and additional azo red dye M377, maintained good pH stability even without the inclusion of a buffer. FIG. 1 shows the pH variation of the inks, including reactive colorant RR31, of Comparative Examples (B1 and B6) and the present invention (Examples A2–A5) over storage duration.

Figure 2:
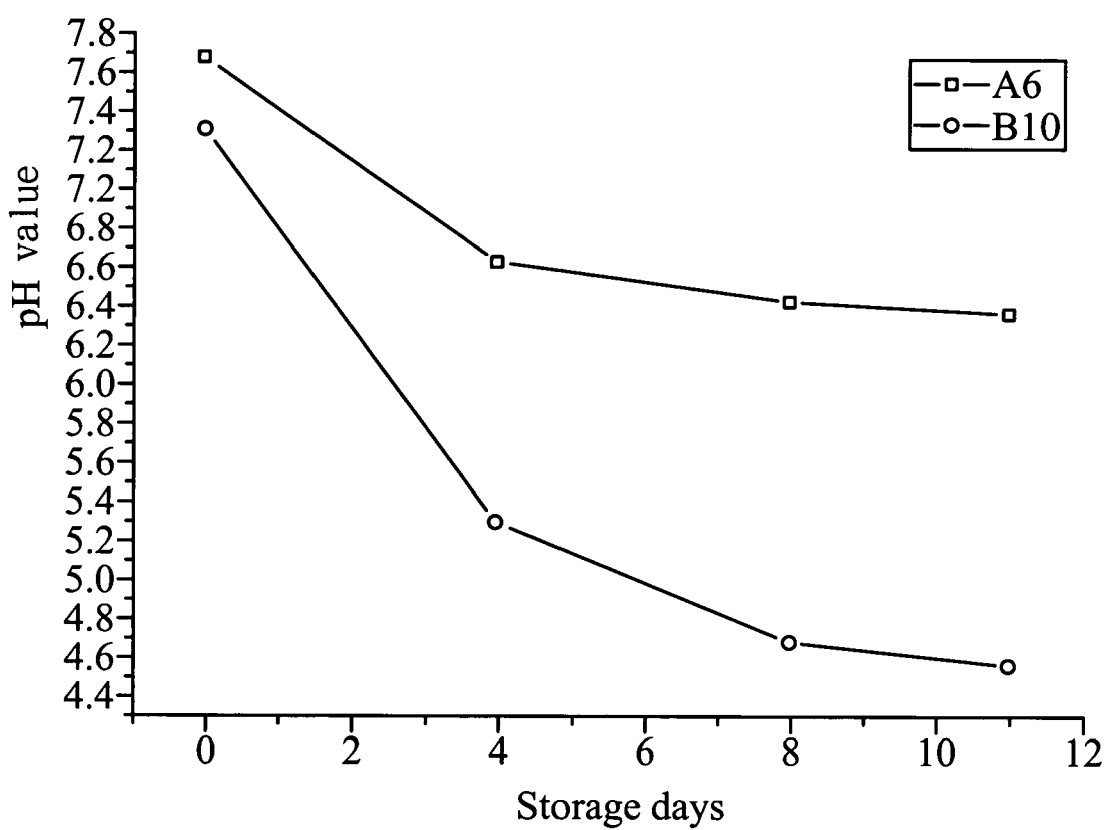
FIG. 2 shows the pH variation of the inks, including reactive colorant RR180, of Comparative Example B10 and the present invention (Examples A6) over storage duration.

Similarly, the above experimental results indicate that the ink composition of Comparative Example B10, including reactive colorant RR180 and buffer, has unstable pH value during storage at 60° C. and thus become more acidic. In contrast, the ink of Example A6 of the present invention, including RR180 and additional azo red dye M377, maintain good pH stability. FIG. 2 shows the pH variation of the inks, including reactive colorant RR180, of Comparative Example B10 and the present invention (Examples A6) over storage time.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A red colorant composition with good pH value stability, comprising:
   at least one reactive red colorant; and
   at least one azo red dye having formula (I):

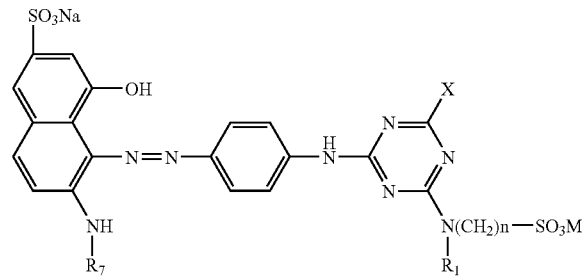

wherein
$R_1$ is hydrogen or an aliphatic radical having from 1 to 6 carbon atoms;
n is 2, 3, or 4;
X is $NR_3R_4$ wherein
$R_3$ and $R_4$ are independently hydrogen, aralkyl, unsubstituted aryl or an aryl substituted by COOM or $SO_3M$; or
$R_3$ and $R_4$ form a ring with or without inclusion of a hetero atom; or
X is $SR_5$ in which $R_5$ is alkyl from 1 to 6 carbon atoms, C2 to C6 substituted alkyl where the substituents are OH, $OCH_3$, COOM, or $SO_3M$; or
X is $OR_6$ in which $R_6$ is hydrogen or an aliphatic radical having from 1 to 6 carbon atoms;
$R_7$ is hydrogen, alkyl of 1 to 6 carbon atoms, C2 to C6 substituted alkyl where the substituents are CN, COOM, OH, $COOCH_3$, $COOCH_2CH_3$; unsubstituted aryl or aryl substituted by $CH_3$ or halogen; and
M is hydrogen, a metal atom, an ammonium or ammonium substituted with alkyl, alkoxyalkyl and hydroxyalkyl each having 1 to 12 carbon atoms.

2. The red colorant composition as claimed in claim 1, wherein the reactive red colorant is Reactive Orange 9, Reactive Orange 12, Reactive Orange 13, Reactive Orange 16, Reactive Red 15, Reactive Red 24:1, Reactive Red 23, Reactive Red 31, Reactive Red 120, Reactive Red 141, Reactive Red 158, Reactive Red 159, or Reactive Red 180.

3. A magenta inkjet ink composition with good pH value stability, comprising:
   at least one reactive red colorant;
   at least one azo red dye having formula (I):

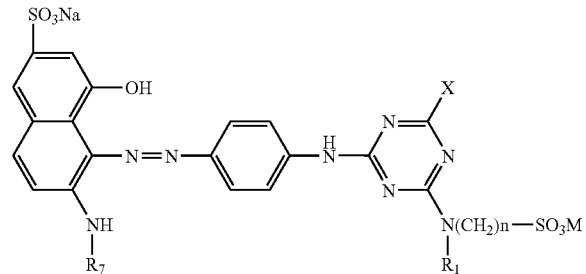

wherein
$R_1$ is hydrogen or an aliphatic radical having from 1 to 6 carbon atoms;
n is 2, 3, or 4;
X is $NR_3R_4$ wherein
$R_3$ and $R_4$ are independently hydrogen, aralkyl, unsubstituted aryl or an aryl substituted by COOM or $SO_3M$; or
$R_3$ and $R_4$ form a ring with or without inclusion of a hetero atom; or
X is $SR_5$ in which $R_5$ is alkyl from 1 to 6 carbon atoms, C2 to C6 substituted alkyl where the substituents are OH, $OCH_3$, COOM, or $SO_3M$; or
X is $OR_6$ in which $R_6$ is hydrogen or an aliphatic radical having from 1 to 6 carbon atoms;
$R_7$ is hydrogen, alkyl of 1 to 6 carbon atoms, C2 to C6 substituted alkyl where the substituents are CN, COOM, OH, $COOCH_3$, $COOCH_2CH_3$; unsubstituted aryl or aryl substituted by $CH_3$ or halogen; and
M is hydrogen, a metal atom, an ammonium or ammonium substituted with alkyl, alkoxyalkyl and hydroxyalkyl each having 1 to 12 carbon atoms; and
an aqueous solution medium.

4. The magenta inkjet ink composition as claimed in claim 3, wherein the reactive red colorant is present in an amount of 0.1 to 10 weight %, and the azo red dye is present in an amount of 0.1 to 10 weight %.

5. The magenta inkjet ink composition as claimed in claim 3, wherein the reactive red colorant is Reactive Orange 9, Reactive Orange 12, Reactive Orange 13, Reactive Orange 16, Reactive Red 15, Reactive Red 24:1, Reactive Red 23, Reactive Red 31, Reactive Red 120, Reactive Red 141, Reactive Red 158, Reactive Red 159, or Reactive Red 180.

6. The magenta inkjet ink composition as claimed in claim 3, wherein the aqueous solution medium is present in an amount of 50 to 95 weight %.

7. The magenta inkjet ink composition as claimed in claim 3, wherein the aqueous solution medium includes a surfactant, a humectant, an organic solvent, a pH buffer solution, a chelating agent, a biocide, a preservative, a UV-blocker, or mixtures thereof.

8. The magenta inkjet ink composition as claimed in claim 7, wherein the aqueous solution medium includes less than 15 weight % of a surfactant.

9. The magenta inkjet ink composition as claimed in claim 7, wherein the aqueous solution medium includes less than 20 weight % of a humectant.

10. An inkjet printing method comprising the following steps:
   providing a magenta inkjet ink composition including at least one reactive red colorant, at least one azo red dye, and an aqueous solution medium; and
   ejecting the magenta inkjet ink composition onto a print medium,
   wherein the azo red dye has formula (I)

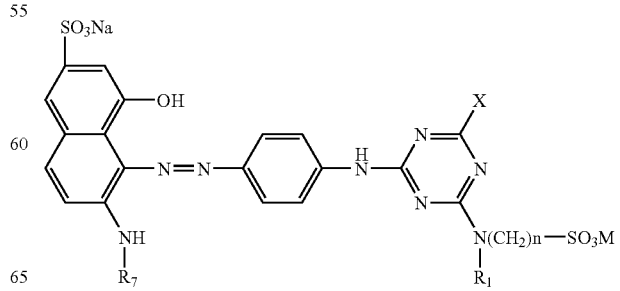

wherein $R_1$ is hydrogen or an aliphatic radical having from 1 to 6 carbon atoms;

n is 2, 3, or 4;

X is $NR_3R_4$ wherein $R_3$ and $R_4$ are independently hydrogen, aralkyl, unsubstituted aryl or an aryl substituted by COOM or $SO_3M$; or $R_3$ and $R_4$ form a ring with or without inclusion of a hetero atom; or X is $SR_5$ in which $R_5$ is alkyl from 1 to 6 carbon atoms, C2 to C6 substituted alkyl where the substituents are $OH$, $OCH_3$, COOM, or $SO_3M$; or X is $OR_6$ in which $R_6$ is hydrogen or an aliphatic radical having from 1 to 6 carbon atoms;

$R_7$ is hydrogen, alkyl of 1 to 6 carbon atoms, C2 to C6 substituted alkyl where the substituents are CN, COOM, OH, $COOCH_3$, $COOCH_2CH_3$; unsubstituted aryl or aryl substituted by $CH_3$ or halogen; and M is hydrogen, a metal atom, an ammonium or ammonium substituted with alkyl, alkoxyalkyl and hydroxyalkyl each having 1 to 12 carbon atoms.

11. The method as claimed in claim 10, wherein the reactive red colorant is present in an amount of 0.1 to 10 weight %, and the azo red dye is present in an amount of 0.1 to 10 weight %.

12. The method as claimed in claim 10, wherein the reactive red colorant is Reactive Orange 9, Reactive Orange 12, Reactive Orange 13, Reactive Orange 16, Reactive Red 15, Reactive Red 24:1, Reactive Red 23, Reactive Red 31, Reactive Red 120, Reactive Red 141, Reactive Red 158, Reactive Red 159, or Reactive Red 180.

13. The method as claimed in claim 10, wherein the aqueous solution medium is present in an amount of 50 to 95 weight %.

14. The method as claimed in claim 10, wherein the aqueous solution medium includes a surfactant, a humectant, an organic solvent, a pH buffer solution, a chelating agent, a biocide, a preservative, a UV-blocker, or mixtures thereof.

15. The method as claimed in claim 14, wherein the aqueous solution medium includes less than 15 weight % of a surfactant.

16. The method as claimed in claim 14, wherein the aqueous solution medium includes less than 20 weight % of a humectant.

* * * * *